(12) United States Patent
Edvardsson

(10) Patent No.: US 8,018,373 B2
(45) Date of Patent: Sep. 13, 2011

(54) SYSTEM AND METHOD FOR FILLING LEVEL DETERMINATION

(75) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 456 days.

(21) Appl. No.: 12/339,507

(22) Filed: Dec. 19, 2008

(65) Prior Publication Data

US 2010/0156702 A1 Jun. 24, 2010

(51) Int. Cl.
*G01S 13/08* (2006.01)
*G01F 23/00* (2006.01)

(52) U.S. Cl. ............... 342/124; 342/118; 73/290 R

(58) Field of Classification Search .............. 342/118, 342/120–124, 165, 173–175; 73/290 R
See application file for complete search history.

(56) References Cited

U.S. PATENT DOCUMENTS

| | | | | |
|---|---|---|---|---|
| 3,394,589 A | * | 7/1968 | Tomioka ............. | 73/290 V |
| 3,750,012 A | * | 7/1973 | Fellers et al. ........ | 324/534 |
| 4,748,846 A | * | 6/1988 | Haynes ................ | 73/290 V |
| 4,928,525 A | * | 5/1990 | Aderholt et al. ..... | 73/290 V |
| 5,095,748 A | * | 3/1992 | Gregory et al. ...... | 73/290 V |
| 5,734,346 A | * | 3/1998 | Richardson et al. .. | 342/124 |
| 5,765,433 A | * | 6/1998 | Johnson ............... | 73/290 V |
| 5,898,308 A | * | 4/1999 | Champion ........... | 324/643 |
| 6,047,598 A | * | 4/2000 | Otto et al. ............ | 73/290 V |
| 6,078,280 A | * | 6/2000 | Perdue et al. ........ | 342/124 |
| 6,184,818 B1 | * | 2/2001 | Meinel ................. | 342/124 |
| 6,229,476 B1 | * | 5/2001 | Lutke et al. .......... | 342/124 |
| 6,559,657 B1 | * | 5/2003 | McCarthy et al. .... | 324/642 |
| 6,701,783 B2 | * | 3/2004 | Fehrenbach et al. .. | 73/290 V |
| 6,795,015 B2 | * | 9/2004 | Edvardsson .......... | 342/124 |
| 6,867,729 B2 | * | 3/2005 | Berry et al. .......... | 342/124 |
| 7,088,285 B2 | * | 8/2006 | Smith .................. | 342/124 |
| 7,255,002 B2 | * | 8/2007 | Gravel et al. ......... | 73/290 V |
| 7,525,476 B1 | * | 4/2009 | Delin et al. .......... | 342/124 |

(Continued)

FOREIGN PATENT DOCUMENTS

EP 1801549 6/2007

(Continued)

OTHER PUBLICATIONS

International Search Report for PCT/SE2009/051413 with filing date Dec. 14, 2009; 4 pages.

*Primary Examiner* — Thomas Tarcza
*Assistant Examiner* — Peter Bythrow
(74) *Attorney, Agent, or Firm* — Westman, Champlin & Kelly, P.A.

(57) ABSTRACT

A radar level gauge system using microwaves for measuring a level of a surface of a product in a container, comprising a waveguide arranged to extend into the product contained in the container, wherein a plurality of reference impedance transitions are arranged at known position along the waveguide and being configured to reflect a portion of transmitted electromagnetic signals back towards the transceiver. Preferably, each of the reference impedance transitions has a first reflection coefficient for the electromagnetic signals when the level of the surface is above the reference impedance transition and a second reflection coefficient for the electromagnetic signal when the level of the surface is below the reference reflector, the first reflection coefficient being substantially lower than the second reflection coefficient. According to this design, a higher accuracy of filling level measurements can be achieved.

15 Claims, 4 Drawing Sheets

U.S. PATENT DOCUMENTS

| | | | |
|---|---|---|---|
| 7,551,122 B1 * | 6/2009 | Delin et al. | 342/124 |
| 7,586,435 B1 * | 9/2009 | Edvardsson | 342/124 |
| 7,924,216 B2 * | 4/2011 | Delin | 342/124 |
| 2005/0024259 A1 * | 2/2005 | Berry et al. | 342/124 |
| 2005/0241391 A1 * | 11/2005 | Kull | 73/313 |
| 2005/0264440 A1 * | 12/2005 | Smith | 342/124 |
| 2007/0085729 A1 * | 4/2007 | Edvardsson | 342/124 |

FOREIGN PATENT DOCUMENTS

| | | |
|---|---|---|
| WO | WO 2007/049966 | 5/2007 |

\* cited by examiner

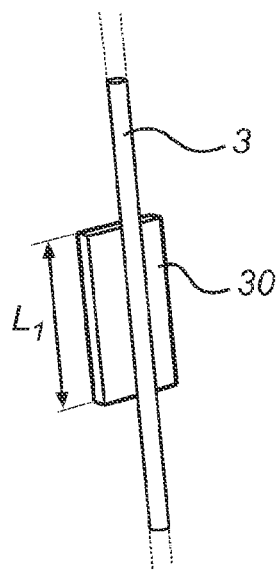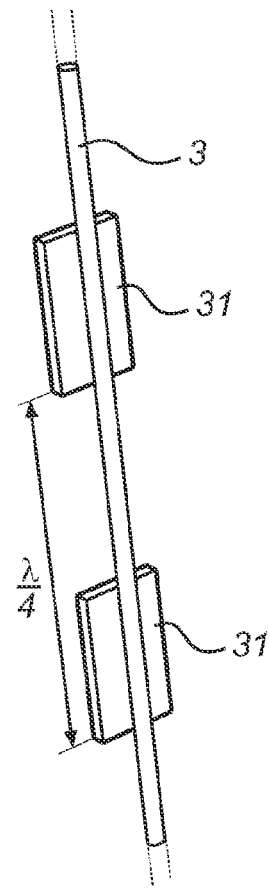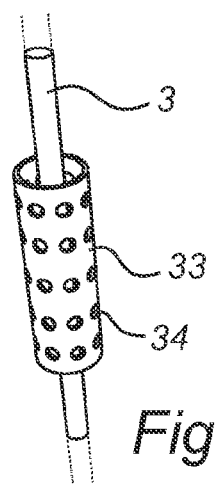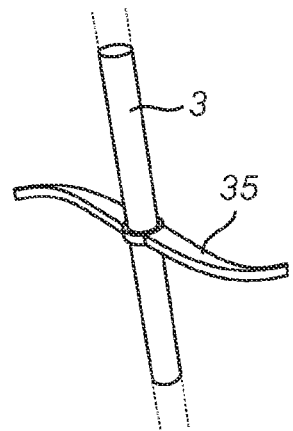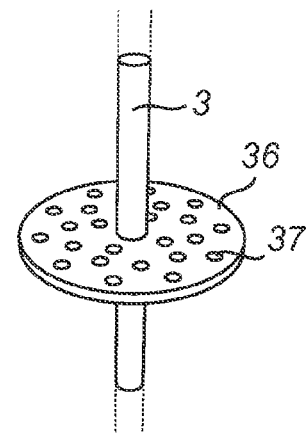
Fig. 2a
Fig. 2b
Fig. 2c
Fig. 2d
Fig. 2e
Fig. 2f

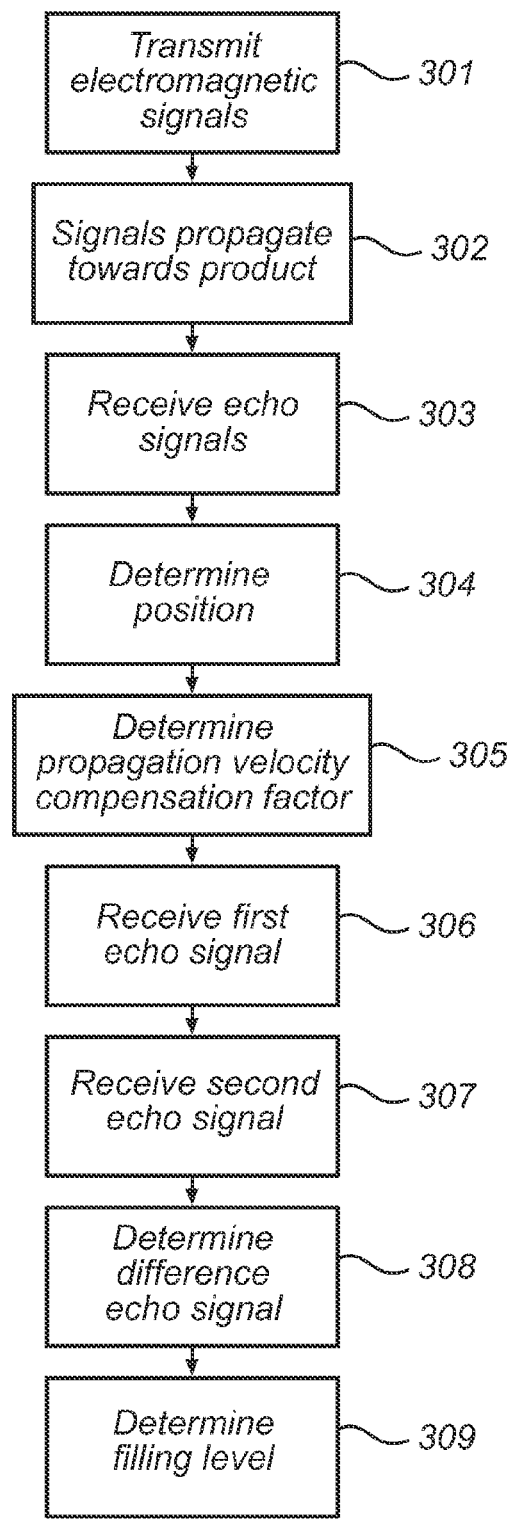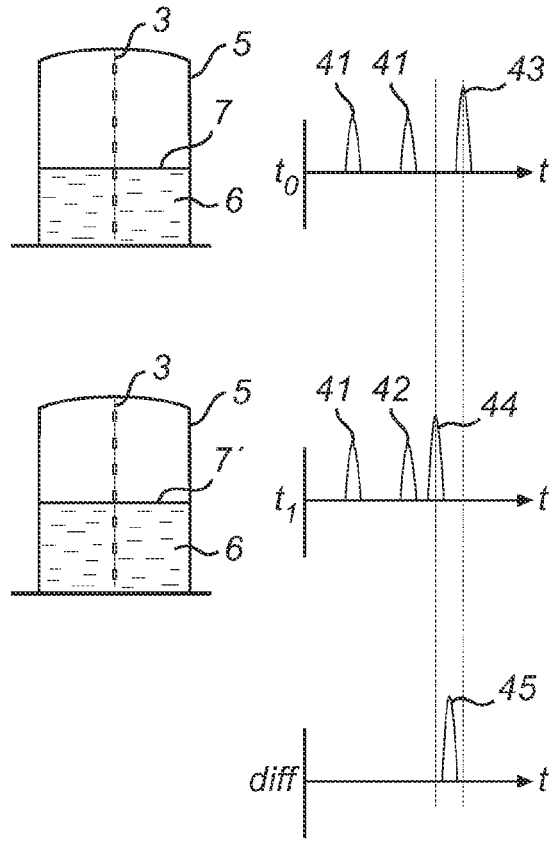
Fig. 3
Fig. 4

SYSTEM AND METHOD FOR FILLING LEVEL DETERMINATION

TECHNICAL FIELD OF THE INVENTION

The present invention relates to a radar level gauge system using a waveguide, such as a single-line of Goubau-type, for determining a filling level of a product contained in a container.

TECHNICAL BACKGROUND

Radar level gauge (RLG) systems are in wide use for determining the filling level of a product contained in a container, such as a tank. Radar level gauging is generally performed either by means of non-contact measurement, whereby electromagnetic signals are radiated towards the product contained in the container, or by means of contact measurement, often referred to as guided wave radar (GWR), whereby electromagnetic signals are guided towards and into the product by a probe acting as a waveguide, such as a probe. The probe is generally arranged to extend vertically from the top towards the bottom of the container. The probe may also be arranged in a measurement tube, a so-called bridle, which is connected to the outer wall of the container and is in fluid connection with the inside of the container.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the container and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the container based on the difference in time between transmission of a pulse and reception of its reflection at the surface of the product, or systems that determine the distance to the surface based on the phase difference between a transmitted frequency-modulated signal and its reflection at the surface. The latter type of systems is generally referred to as being of the FMCW (Frequency Modulated Continuous Wave) type.

In any case, the propagated electromagnetic signal is typically not only reflected at the impedance transition constituted by the interface between atmosphere and surface, but at several other impedance transitions encountered by the signal. Such impedance transitions may, for example, result from fixed structures in the container or, in the case of a GWR-system, product residue that may have adhered to the probe as the filling level of the product changes inside the container.

There is therefore a certain risk that the system attempts to determine the filling level based on the wrong reflected signal. This is especially the case when the product inside the container has similar signal propagation characteristics as the atmosphere in the container. This results in a small impedance transition and, accordingly, a relatively weak echo signal. Examples of products yielding relatively weak echo signals are liquid natural gas (LNG), liquid petroleum gas (LPG), oil-based products, solids such as plastic pellets or grain etc. Beside of having low reflection these liquids are transparent for radar waves so an echo below the surface will be visible through the surface as well and may interfere with the surface echo. Typical radar level gauging systems can distinguish between echoes which are at least a few dm to half a meter apart and for liquids having a small attenuation (a few dB) over such a distance close echoes can be mixed up resulting in considerable errors in the measured distance while the surface is moving.

One way of reducing the risk for such an erroneous determination of the filling level is to make a reference filling level measurement when the container is empty. A typical result from such a reference filling level measurement is a disturbance echo profile, in which echoes representing disturbances that may be present in the container are visible. This disturbance echo profile can be used to modify an echo profile obtained during normal measurement conditions. For example, for a pulsed RLG system, at least a part of the disturbance echo profile may be subtracted from the echo profile obtained during normal measurement conditions.

However, conditions in the container generally vary over time in such a way that existing disturbances move and/or new sources of disturbance echoes are added, such as, for example, lumps of material, such as oil, adhering to the probe in the case of GWR-measurements.

Such varying conditions may be taken into account by determining a disturbance echo profile during normal measurement conditions, when the container is not empty. However, such a disturbance echo profile can then only be reliably determined above the surface of the product contained in the container, because of the relatively stable propagation characteristics in the atmosphere above the surface of the product.

U.S. Pat. No. 6,078,280 discloses a method for determining a disturbance echo profile above the surface of a product contained in a container, involving automatically determining a transition point that defines which part of a newly acquired echo profile to use for updating a previously stored disturbance echo profile. According to U.S. Pat. No. 6,078,280, this transition point is determined based on the surface echo signal.

Under certain conditions such as in case with close and strongly disturbing echoes, it may, however, be difficult to determine the surface echo signal, which may result in that the surface echo signal is included in the disturbance echo profile when the method disclosed in U.S. Pat. No. 6,078,280 is used, which may lead to an incorrect filling level determination.

SUMMARY OF THE INVENTION

In view of the above-mentioned and other drawbacks of the prior art, a general object of the present invention is to provide an improved radar level gauge system and method, and in particular a radar level gauge system and method capable of higher accuracy filling level determination.

According to a first aspect of the present invention, these and other objects are achieved through a radar level gauge system using microwaves for measuring a level of a surface of a product in a container, comprising a transceiver for generating, transmitting and receiving electromagnetic signals within a frequency range, a waveguide arranged to extend into the product contained in the container and to guide signals transmitted from the transceiver towards a surface of the product and to guide echo signals resulting from reflections at impedance transitions encountered by the transmitted electromagnetic signals, including surface echo signals resulting from reflection at the surface, back to the transceiver, processing circuitry connected to the transceiver and arranged to determine the level of the surface based on a relation between the transmitted and received electromagnetic signals, an interface for providing communication externally of the system and for receiving power to the radar level gauge system, and a plurality of reference impedance transitions being arranged at known positions along the waveguide and being configured to reflect a portion of the transmitted electromagnetic signals back towards the transceiver, wherein each of the reference impedance transitions has a first reflection coefficient for the electromagnetic signals when the level of the surface is above the reference impedance transition and a second reflection coefficient for the electromagnetic signal when the level of the surface is below the reference impedance transition, the first reflection coefficient being substantially lower than the second reflection coefficient.

In the context of the present application, the waveguide is a "probe" designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

A single line of Goubau-type may be defined as a line or wire of a material with limited conductivity (such as stainless steel) or a line with good conductivity (copper-clad stainless steel) covered by a dielectric layer (PTFE etc). In contrast to a line with perfect conductivity the Goubau-line can support a propagating signal by longitudinal current in the line. The electromagnetic field will have a diameter of some dm and have an exponential decay in the radial direction.

The "transceiver" may be one functional unit capable of transmitting and receiving electromagnetic signals, or may be a system comprising separate transmitter and receiver units.

The container may be any tank or vessel capable of containing a product, and may be metallic, or partly or completely non-metallic, open, semi-open, or closed.

That the position of each of the reference impedance transition is "known" means that the position has been previously determined by means of any suitable measurement technique (such as mechanic during manufacturing). For example, the position may be determined based on received electromagnetic signals reflected by the respective reference impedance transition, but under controlled conditions, such as during production of the radar level gauge system or when the system is installed but the probe is clean and the container empty.

Furthermore, the reference impedance transition may be regularly or irregularly spaced with a spacing that may typically be around 1-6 m. Especially in the case of a relatively long probe, such as a probe longer than, say, 15-20 m, it may be advantageous to arrange the reference reflectors to be irregularly spaced along the probe so as to avoid interference effects by multiple scattering.

The present invention is based on the realization that the accuracy of filling level measurements can be improved by using a plurality of reference impedance transitions that are arranged at a respective known position along the probe. From a general perspective the reference impedance transitions are used as references for improving the accuracy of filling level measurements when using "wire based" radar level gauge systems. However, echoes from reference impedance transitions below the surface will generally deteriorate the accuracy of filling level measurements.

However, according to the invention, as the plurality of reference impedance transitions each has a first reflection coefficient when the filing level is above the reference impedance transition and a second reflection coefficient when the filling level is below the reference impedance transition, the first reflection coefficient being substantially lower than the second reflection coefficient, their echoes may essentially by their design be filtered out. That is, the inventive reference impedance transitions that at one point in time are arranged below the surface will "disappear". Thus, essentially no echoes below the surface will be provided by the reference impedance transitions, and as a result improve the accuracy of filling level measurements, i.e. they will essentially not influence the echo signals.

In comparison, a prior art reference impedance transitions being submerged, and not being "invisible" to electromagnetic signal, may pose a problem for example when the surface level is located closely above a reference impedance transition as the reference impedance transition will provide a large reflection which may "shadow" the surface reflection. Furthermore, submerged "visible" reference impedance transitions will proportionally move along with the surface of the product when the surface is fluctuating.

Advantageously, generating and transmitting electromagnetic signals may include frequency-modulating the electromagnetic signals. This is, for example, the case for so-called frequency-modulated radar level gauge (RLG) systems, such as FMCW-systems and for so-called pulsed radar level gauge systems in which the pulses are modulated on a carrier.

In a preferred embodiment, the processing circuitry may be adapted for determining a position of at least one reference impedance transition located above the filling level using an echo signal resulting from reflection of the transmitted electromagnetic signals at the at least one reference impedance transition, determining a propagation velocity compensation factor based on the determined position of the at least one reference impedance transition above the filling level and the known position of that at least one reference impedance transition located above the filling level, receiving a first echo signal resulting from reflection of the transmitted electromagnetic signals at a first surface level, receiving a second echo signal resulting from reflection of the transmitted electromagnetic signals at a second surface level, the second surface level being different from the first surface level, determining a difference between the first and the second echo signal, and determining the filling level based on the difference and the propagation velocity compensation factor.

For generating a difference, the surface level will have to slightly fluctuate between the point in time of receiving each of the two echo signals. Such fluctuation may be achieved when the container is located in a marine environment (e.g. on a boat) or at the time of pumping the product in and out of the container.

Accordingly, it is possible to further improve the accuracy of filling level measurements by combining both the determined propagation velocity compensation factor and the difference between two (for example consecutive) echo signals. That is, the propagation velocity compensation factor will be used for compensating for the speed at which the electromagnetic signals passes through the waveguide around which a medium, such as air, a gas or the product contained in the container, which medium will also influence the speed of the electromagnetic signals.

However, the present inventor has, furthermore, realized that an improved compensation can be achieved if echoes resulting from the reference impedance transition can be filtered out, e.g. being subtracted out from a surface echo signal resulting from reflection at the surface of the product contained in the container. The filtering is performed by comparing two different (and maybe consecutive) echo signals and determining a difference between these echo signals, resulting in a difference signal. The difference signal may, as noted above, be compensated using the propagation velocity compensation factor, and thereafter used for determining the filing level of the product contained in the container. For example, the lowest reference echo above the surface gives a known distance. This echo together with one or a plurality of reference echoes further away and above the surface allows for determined propagation velocity compensation factor, which will be followed by surface measurements taking into account removal of reference echoes above the surface as well as the functionality of invisible submerged reflectors.

In one embodiment, an inventive radar level gauge system of GWR type may have a transmission frequency range around approximately 0.1-1 GHz. However, the frequency range may also possibly be around approximately 0.5-1.5 GHz. The frequency range 0.1-1 GHz correspond roughly to a traditional TDR-system using a half-wave pulse of typically 1 ns length. The relative bandwidth is large (in the order of 1:10). It is also possible to use a wave-packet of one full period or more and then the relative bandwidth will shrink to 1:2 or 1:3 at the expense of the pulse length.

Each reference impedance transition, for example in the form of a reference reflector, may be implemented as a structure capable of reflecting electromagnetic signals traveling along the probe and may be achieved by means of a structure external to the probe, an internal structure in the probe, or a combination thereof. Furthermore, different reference impedance transition may be provided as identical or different reflecting structures.

Accordingly, in one embodiment at least one of the plurality of reference impedance transitions may comprise a cylinder, of metal or of a dielectric material, arranged to essentially enclose a portion of the waveguide. However, it may also be possible to instead or also use at least one reference impedance transition comprising a plate, again of metal or of a dielectric material, attached to the waveguide.

In the context of the present application, the reference impedance transition should be understood to be irregularly spaced if the standard deviation of the distances between adjacent reference impedance transitions is larger than a quarter of the achievable distance resolution of the radar level gauge system.

For an exemplary radar level gauge system of pulsed GWR type having a pulse length of 1 ns, the resolution in distance is about 150 mm, that is, for discrimination of two adjacent echo signals to be enabled, these echo signals should result from reflections at impedance transitions which are spaced apart by at least 150 mm. For such a system, the above-mentioned standard deviation should therefore be at least 150/4=37.5 mm. In practice, the standard deviation should preferably be slightly larger, such as above 50 mm, especially for a long probe (longer than about 20 m) having a large number (more than about 20) of reference reflectors.

This will effectively reduce the effect of co-operation between reflections from different reference impedance transition and multiple reflections, and will allow a smaller spacing and/or a larger number of reference impedance transitions.

Thus, at least one of the plurality of reference impedance transitions may comprise two pieces of metal, or one shaped accordingly, attached to the waveguide, where the two pieces having a distance of $\lambda/4$ apart in relation to the frequency range of the transmitted and received electromagnetic signals. Additionally or alternatively, at least one of the plurality of reference impedance transitions may comprise a stamped plate attached horizontally to the waveguide and shaped to give one resonance frequency above the surface and a lower one below the surface of the product in the container. In this case the resonance frequency may be designed to escape out of the used frequency band when the reference impedance is below the surface.

The interface can be adapted to receive power in an intrinsically safe manner, typically by means of an electrical barrier. The interface can be a two-wire interface, arranged both to transmit measurement data to a remote location and to receive power for operation of the system. For example, the interface can be a 4-20 mA industrial loop with superimposed digital communication (HART), a Fieldbus Foundation bus, or a Profibus. Such loops are widely used to power radar level gauges. Alternatively, the interface can be four-wire interface. It should furthermore be noted that the two-wire interface of the radar level gauge system may be arranged both to transmit measurement data to a remote location and to receive power for operation of the radar level gauge system. Additionally, the radar level gauge system may further comprise a current control unit, adapted to regulate the current in the two-wire interface in accordance with the measured level.

According to a second aspect of the present invention, the above-mentioned and other objects are achieved by a method for determining a filling level of a product contained in a container, by means of a radar level gauge system comprising a transceiver for generating, transmitting and receiving electromagnetic signals within a frequency range, a waveguide arranged to extend into the product contained in the container and to guide signals transmitted from the transceiver towards a surface of the product and to guide echo signals resulting from reflections at impedance transitions encountered by the transmitted electromagnetic signals, including surface echo signals resulting from reflection at the surface, back to the transceiver, processing circuitry connected to the transceiver and arranged to determine the level of the surface based on a relation between the transmitted and received electromagnetic signals, an interface for providing communication externally of the system and for receiving power to the radar level gauge system, and a plurality of reference impedance transitions being arranged at known position along the waveguide and being configured to reflect a portion of the transmitted electromagnetic signals back towards the transceiver, wherein each of the reference impedance transitions has a first reflection coefficient for the electromagnetic signals when the level of the surface is above the reference impedance transition and a second reflection coefficient for the electromagnetic signal when the level of the surface is below the reference impedance transition, the first reflection coefficient being substantially lower than the second reflection coefficient.

Preferably, the method comprises the steps of identifying, based on received electromagnetic signals reflected by the reference impedance transitions, a set of reference impedance transitions located above the level of the surface, selecting first and second reference impedance transition comprised in the set of reference impedance transitions, determining a propagation velocity compensation factor based on a known distance between the first and second reference impedance transition and a distance therebetween determined using received electromagnetic signals reflected by the first and second reference impedance transition, respectively, and determining the level of the surface based on a received electromagnetic signal reflected by the surface of the product, and the propagation velocity compensation factor.

It should be noted that the method according to the present invention is by no means limited to performing the steps thereof in any particular order.

As discussed above in connection with the first aspect of the present invention, the inventive reference impedance transitions and the inventive steps may together or individually further improve the accuracy of filling level measurements.

Further embodiments of, and effects obtained through this second aspect of the present invention are largely analogous to those described above for the first aspect of the invention.

Various embodiments of, and effects obtained through this third aspect of the present invention are largely analogous to those described above for the first and second aspects of the invention.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a;

FIG. 1c is a schematic cross-section view of a portion of the probe comprised in the radar level gauge system in FIG. 1a;

FIG. 2a-2f illustrates six different embodiments of reference reflectors, ISRs, according to the invention; and FIG. 3 is a flowchart schematically illustrating an embodiment of the method according to the present invention.

FIG. 4 conceptually illustrates surface and reference reflector echoes during operation of an exemplary radar level gauge system.

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a rigid single line (or Goubau) probe. It should be noted that this by no means limits the scope of the present invention, which is equally applicable to various other kinds of probes, such as two-lead probes, flexible probes, etc.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

Figure 1A:
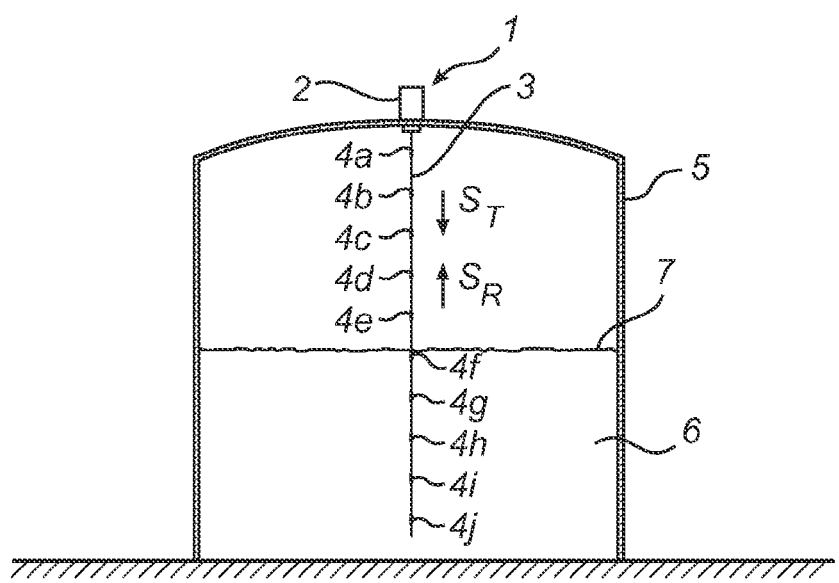
FIG. 1a schematically illustrates a radar level gauge system according to an embodiment of the present invention installed in an exemplary tank.

FIG. 1a schematically illustrates a radar level gauge system 1 according to an embodiment of the present invention, comprising processing circuitry such as a measurement electronics unit 2, and a waveguide such as a probe 3 having a plurality of reference impedance transitions such as reference reflectors 4a-j. The radar level gauge system 1 is provided on a container such as a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 1B:
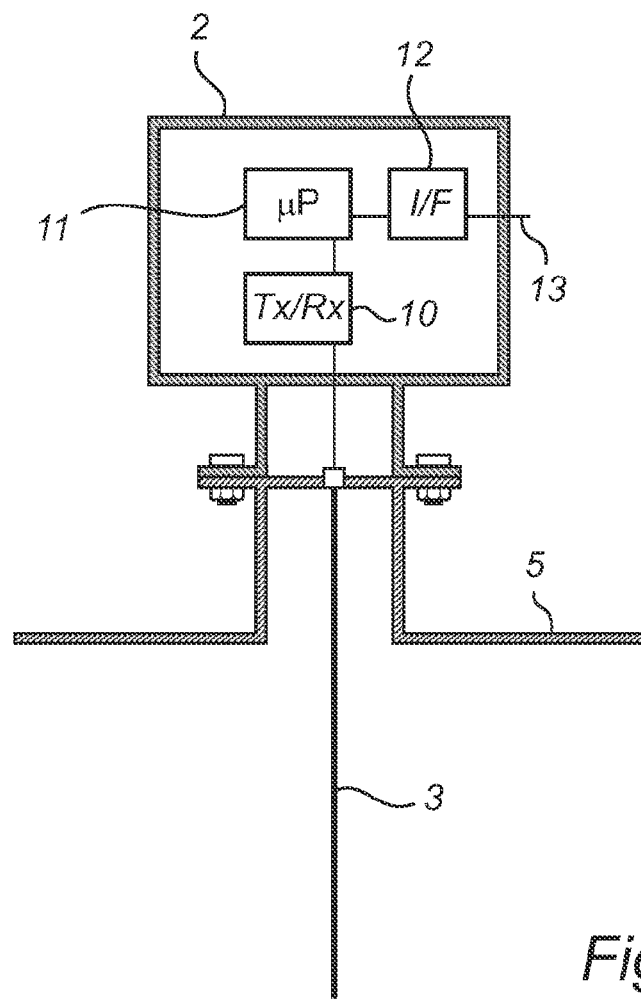

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13 or by internal batteries, solar cells etc. Alternatively, the radar level gauge system 1 may be configured to communicate wirelessly. Also, in some cases a local readout may be used.

Figure 1C:
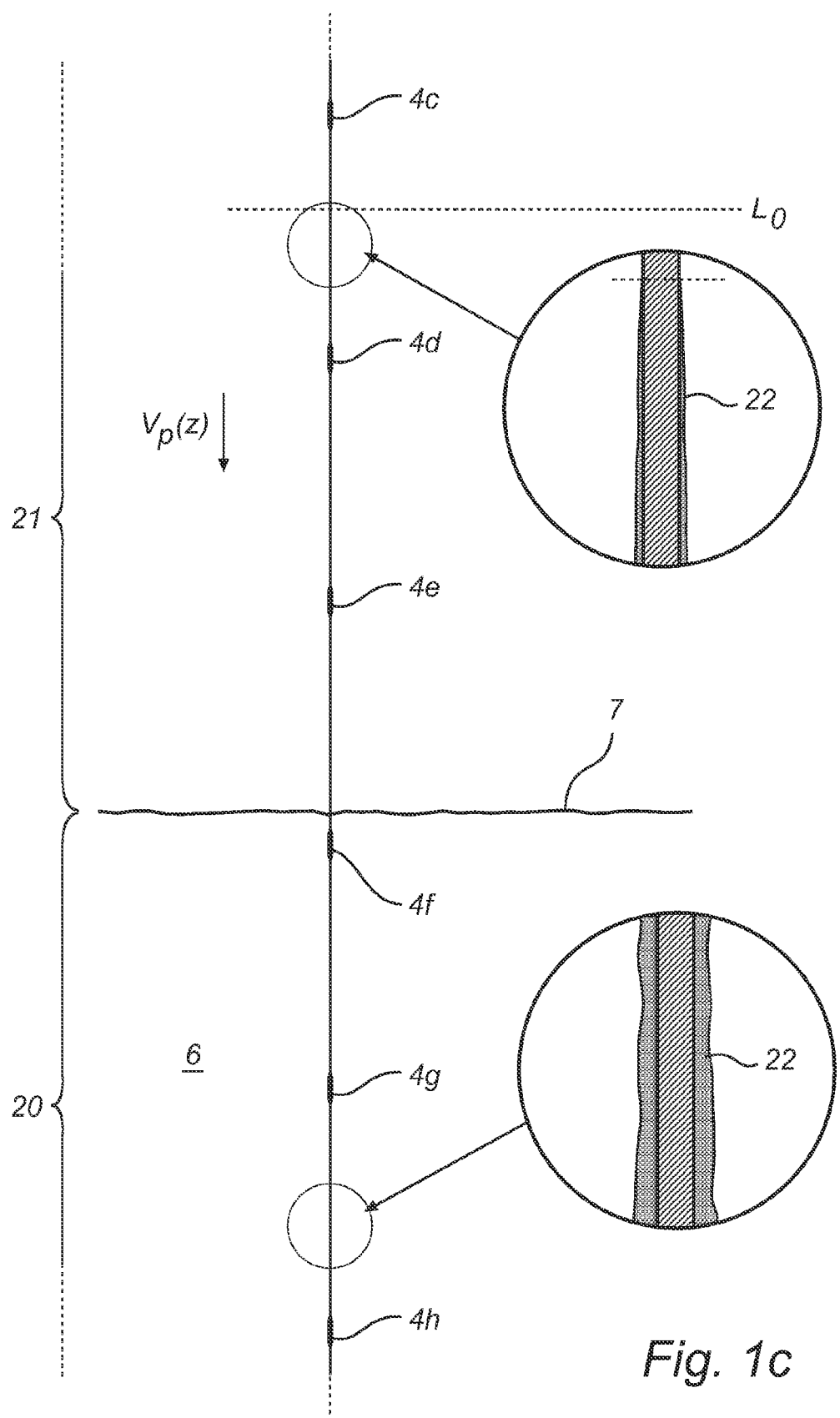

In FIG. 1c, a segment of the probe 3 comprising a submerged portion 20 and an unsubmerged portion 21 is shown. As can be seen in FIG. 1c, the submerged portion 20 of the probe 3 is provided with submerged reference reflectors 4f-j, and the unsubmerged portion 21 of the probe 3 is provided with a set of unsubmerged reference reflectors 4a-i. Due to variations in the filling level of the product 6 in the tank 5, a layer 22 of product 6 may adhere to the probe 3. Evidently, portions of the probe 3 that have never been submerged in the product 6 will have no such layer or at least only a thin one, while portions that have been alternating submerged and unsubmerged in the product 6 may have such a layer 22 formed thereon. This situation is schematically illustrated in FIG. 1c, where a gradually thinner adhered layer 22 of product 6 is shown to exist up to the indicated level $L_0$.

Due to this non-uniform contamination layer 22, the electromagnetic signals traveling along the probe will have a propagation velocity $v_p(z)$ that depends on the position along the probe 3. If not compensated for, this position-dependent propagation velocity $v_p(z)$ may result in a substantial measurement error. However, through the present invention, the relationship between the known positions of reference reflectors provided on the unsubmerged portion 21 of the probe 3 is used to compensate for the layer 22 on the probe 3.

That is, by arranging the plurality of reference reflectors 4a-j as indicated in FIG. 1c, and with a suitable distance between adjacent reflecting structures, the echo signals $S_R$ reflected by each reference reflector for a given frequency depends on the electrical distance between adjacent reference reflectors. By determining the frequency or the time delay, the electrical distance between adjacent reference reflectors 4a-j can be deduced. Knowing the physical distance between adjacent reference reflectors 4a-j, the propagation velocity can then be determined. Using the thus determined propagation velocity, the filling level of the product 6 contained in the tank 5 can be determined with high accuracy. Furthermore, as the submerged reference reflectors 4f-j will be essentially "invisible", essentially no echo signals $S_R$ will be produced by the submerged reference reflectors 4f-j, and thus they will not disturb the level measurement. Accordingly, essentially only the unsubmerged reference reflectors 4a-l will generate an echo.

The reference reflectors that are arranged along the probe 3 may be provided in various forms depending on the type of waveguide that is included in the radar level gauge system 1. Below, a few exemplary probes 3 provided with reflecting structures will be described with reference to FIGS. 2a-d. It should be noted that all reflectors discussed below are basically intended for single wire GWRs. However, the same principle may also be used on twin wires where support pieces between the lines generally may be used.

It should be noted that the number of reference reflector located along the probe 3 may be one, two or many. With one reference reflector it may be possible only to only achieve a check at a desired level while two reference reflectors also may provide a scale factor check. With three reference reflectors it may also be possible to get a function for checking and/or local calibration at a high level (always visible), or a calibration value at a known distance over the bottom and a scale factor check in the lower part of the tank 5 where the scale factor is important. Positioning of the reference reflectors may be selected according to the use of the tank 5. It should be noted that the reference reflectors themselves may introduce an error (a typical measurement will be based on three measurements each with its error) especially when many reference reflectors are.

The most typical feature of the reference reflectors according to the invention is that the reflection is different when the reference reflector is above or below the surface 7, accordingly possibly being defined as Invisible Submerged Reflectors (ISRs). In the unsubmerged position the reference reflector has a certain and measurable reflection, but in submerged position the reflection is much smaller and may with a good design possibly be neglected. This property is generally interesting when the product 6 is some kind of oil or hydrocarbon which is "transparent" for radar. The dielectric constant of such products 6 is low, possibly less than 3, and the function of most of the designs discussed below may assume a narrower interval for dielectric constant for good function. An exemplary embodiment may be a tank 5 for liquid methane. In such a case, liquids with higher dielectric constant are generally more or less opaque for radar so any reflector will be hidden when below the surface regardless to their design. An example of such a reflector used for a different purpose is disclosed in U.S. Pat. No. 6,795,015, which is fully incorporated by reference. However, in U.S. Pat. No. 6,795,015 the use of the reflector is for the sole purpose of performing level gauging without any interference from microwaves reflected from the bottom of the tank or a distinct reflect from the bottom reflector when the tank is empty.

FIG. 2a illustrates a first embodiment of an ISR, i.e. reference reflector 30 according to the invention. The reference reflector comprises a metal piece attached along the wire in the shape of a cylinder with bigger diameter or a plate clamped to the wire. This piece will lower the impedance of the wire and by using a fairly narrow-band system (less than one octave) and making the length $L_1$ of the piece half a wavelength long, it may be possible to have a very low reflection when submerged, and a relatively high reflection when in the air (e.g. unsubmerged). The reflection may still be lower than that from the surface echo. The principle may be referred to as a "λ/2-reflector" which is known in the design of λ/2-radomes.

In FIG. 2b, another type of ISR 31 is illustrated, comprising two pieces of metal (or one shaped accordingly) attached to the wire λ/4 apart, which will cancel its reflections when submerged (where the λ/4 condition is valid) but have a measurable reflection when unsubmerged. Below the surface the reflectors will cause echoes separated by 180° and thus cancelling each other.

Still another type of ISR 32, in this embodiment a suitably stamped plate, is illustrated in FIG. 2c. The plate 32 may be attached horizontally to the wire and shaped to give one resonance frequency above the surface and a lower one below the surface. For a radar level gauge system 1 with a limited bandwidth (for example less than approximately one octave) it may be possible to allow the resonance to go outside the used band below the surface and be more or less invisible.

Another type of ISR 33, as is illustrated in FIG. 2d, is a piece of plastic material having a similar dielectric constant as the liquid (or slightly above 2 like most liquids transparent for radar) when it is submerged due to the same average caused by the perforation. Below the surface it will be naturally invisible as it will appear as a continuation of the liquid with no or only a small step in dielectric constant. Several shapes can be thought of like a cylinder surrounding the wire of a dielectric piece attached to the wire. By the shape of this dielectric piece (such as holes 34, perforation etc) the dielectric constant of the material can be "adjusted" to match the dielectric constant of the liquid. In contrast to the reflectors made of pieces of frequency dependent size (like λ/2 long or situated λ/4 apart) this principle can be used also when a wide band signal (like 0.1-1 GHz for a traditional TDR-system) is used.

Still yet another principle for reflectors of ISR-type 35, as is illustrated in FIG. 2e, is a more or less horizontal tapered plate attached to the Goubau line or with suitable shape also to another type of line like a twin line. The plate is shaped to include one or more resonances which will be changed when the reflector is immersed in the liquid. A possible shape may be a tapered "wing form", where the overall length from the center to the outer end may be approximately 6-8 cm, corresponding to quarter of a wavelength. By its shape more possible resonances can be shaped which can adopt the function to a wider frequency band. The "wing" is preferably of metal.

Furthermore, it may be possible to provide a flat and essentially circular plate to be used as an ISR. An example, ISR 36, is illustrated in FIG. 2f. The plate may for example be of a suitable plastic material, and possibly perforated by holes 37 as in relation to the ISR 33 illustrated in FIG. 2d. The horizontal plates of FIG. 2e and 2f has the advantage that it is short in vertical direction making is more sensitive for small level changes.

As mentioned above, the reflectors illustrated in FIG. 2a-2f may be used with Gobau lines, but twin lines and all kinds of waveguides may have reflectors using the ISR principle.

As is noted above, a general problem with prior art reflectors is that they may disturb the level measurements, for example in the case a reflector is located close to the surface of the material to be measured. The inventive ISRs, e.g. the reference reflectors 30, 31, 32, 33, 35, at least partly addresses this problem as they may be arranged to have a substantially lower reflection coefficient when submerged as compared to unsubmerged. Accordingly, submerged reflectors will be essentially invisible (e.g. essentially not producing any echo) and thus not problematic when close to the surface to be measured.

However, the echoes from unsubmerged reflectors may still be present (and as mentioned above used for determining a propagation velocity compensation factor), and posing a problem when positioned closed to the surface. This may be addressed by means of the inventive method, wherein also echoes from unsubmerged reflectors may be "removed". It should also be noted that the removal of echoes from unsubmerged reflectors may be done separately from the case where ISRs are used.

In a possible but non limiting implementation echoes resulting from unsubmerged reference reflectors may be removed, e.g. being subtracted out from a surface echo signal resulting from reflection at the surface of the product 6 contained in the tank 5, for further improve the accuracy of filling level measurements. This removal may for example be done already in an early stage, e.g. early in the processing chain. For example, a signal processor equipped with a memory for storing earlier received echo signals (possibly digital but preferably with possible phase content intact) may be used for comparison and/or subtraction of subsequently received echo signals. In such a case, if a suitable time interval between subsequent measurements is selected, and the surface level has changed only slightly, two subsequent echo signals may be compared and/or subtracted thereby forming a difference signal. Accordingly, overlapping echoes from the unsubmerged reflectors may "disappear".

With reference to the schematic flow-chart in FIG. 3 and the filling level and corresponding surface and reference reflector echoes shown in FIG. 4, an embodiment of the method according to the present invention will now be described.

In a first step 301, electromagnetic signals are generated and transmitted by the transceiver 10 comprised in the measurement electronics unit 2 of the radar level gauge system 1. Subsequently, in step 302, transmitted signals are propagated towards the surface 7 of the product 6 contained in the tank 5 using a waveguide 3 provided with the plurality of reference reflectors 4a-j. In the next step 303, the reference signal and a surface echo signal resulting from reflection of the transmitted electromagnetic signal $S_T$ at the surface 7 of the product 6 in the tank 5 are received by the transceiver 10. Thereafter, in step 304, the processing circuitry 11 comprised in the radar level gauge system 1 determines a position of at least one unsubmerged reference reflectors using an echo signal (e.g. reference echoes 41 and 42 of FIG. 4) resulting from a reflection of the transmitted electromagnetic signals at that the reference reflector. In step 305, the processing circuitry 11 determines a propagation velocity compensation factor based on the determined position of the unsubmerged reference reflector and the known position of that reference reflector. Thereafter, in step 306, the processing circuitry 11 receives a first echo signal 43 resulting from reflection of the transmitted electromagnetic signals at a first surface level 7, followed by step 307, where the processing circuitry 11 receives a second echo signal 44 resulting from reflection of the transmitted electromagnetic signals at a second surface level 7', the second surface level 7' being different from the first surface level 7. Thereafter, in step 308, the processing circuitry 11 determines a difference echo signal 45 between the first and the second echo signal, 43 and 44, respectively. Finally, in step 309, the processing circuitry 11 determines the filling level based on the difference and the propagation velocity compensation factor.

For generating a difference, the surface level will have to slightly fluctuate between the point in time of receiving each of the two echo signals 43 and 44. Such fluctuation may be achieved when the container is located in a marine environment (e.g. on a boat) or at the time of pumping the product in and out of the container.

As is noted, the propagation velocity compensation factor will be used for compensating for the speed at which the electromagnetic signals passes through the waveguide around which a medium, such as air, a gas or the product contained in the container, which medium will also influence the speed of the electromagnetic signals. Furthermore, the reference impedance transition can be removed, e.g. being subtracted out from a surface echo signal resulting from reflection at the surface of the product contained in the container. The removal is performed by comparing two different (and maybe consecutive) echo signals and determining a difference between these echo signals, resulting in a difference signal. The difference signal may, as noted above, be compensated using the propagation velocity compensation factor, and thereafter used for determining the filing level of the product contained in the container.

In summary, the invention relates, among other things, to a radar level gauge system using microwaves for measuring a level of a surface of a product in a container, comprising a waveguide arranged to extend into the product contained in the container, wherein a plurality of reference impedance transitions are arranged at a respective known position along the waveguide and being configured to reflect a portion of the transmitted electromagnetic signal back towards the transceiver. Preferably, each of the reference impedance transitions has a first reflection coefficient for the electromagnetic signals when the filing level is above the reference impedance transition and a second reflection coefficient for the electromagnetic signal when the filling level is below the reference reflector, the first reflection coefficient being substantially lower than the second reflection coefficient. According to this design, a higher accuracy of filling level measurements can be achieved.

Even though the invention has been described with reference to specific exemplifying embodiments thereof, many different alterations, modifications and the like will become apparent for those skilled in the art.

Variations to the disclosed embodiments can be understood and effected by the person skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A radar level gauge system using microwaves for measuring a level of a surface of a product in a container, comprising:
    a transceiver for generating, transmitting and receiving electromagnetic signals within a frequency range,
    a waveguide arranged to extend into said product contained in the container and to guide signals transmitted from said transceiver towards a surface of said product and to guide echo signals resulting from reflections at impedance transitions encountered by the transmitted electromagnetic signals, including surface echo signals resulting from reflection at said surface, back to said transceiver,
    processing circuitry connected to the transceiver and arranged to determine the level of the surface based on a relation between the transmitted and received electromagnetic signals,
    an interface for providing communication externally of said system and for receiving power to the radar level gauge system, and
    a plurality of reference impedance transitions being arranged at known positions along the waveguide and being configured to reflect a portion of said transmitted electromagnetic signals back towards said transceiver,
    wherein each of said reference impedance transitions has a first reflection coefficient for said electromagnetic signals when the level of the surface is above the reference impedance transition and a second reflection coefficient for said electromagnetic signal when the level of the surface is below the reference impedance transition, said first reflection coefficient being substantially lower than said second reflection coefficient.

2. Radar level gauge system according to claim 1, wherein the waveguide is a single wire transmission line of Goubau-type.

3. Radar level gauge system according to claim 1, wherein the processing circuitry is adapted for:
determining a position of at least one reference impedance transition located above the level of the surface using an echo signal resulting from reflection of said transmitted electromagnetic signals at said at least one reference impedance transition,
determining a propagation velocity compensation factor based on said determined position of said at least one reference impedance transition above the level of the surface and the known position of that at least one reference impedance transition located above the level of the surface,
receiving a first echo signal resulting from reflection of said transmitted electromagnetic signals at a first level of the surface,
receiving a second echo signal resulting from reflection of said transmitted electromagnetic signals at a second level of the surface, the second level of the surface being different from the first level of the surface,
determining a difference between said first and said second echo signal, and
determining said filling level based on said difference and said propagation velocity compensation factor.

4. Radar level gauge system according to claim 1, wherein the frequency range is approximately 0.1-1 GHz.

5. Radar level gauge system according to claim 1, wherein the frequency range is approximately 0.5-1.5 GHz.

6. Radar level gauge system according to claim 1, wherein at least one of said plurality of reference impedance transitions comprises a cylinder arranged to essentially enclose a portion of said waveguide.

7. Radar level gauge system according to claim 1, wherein at least one of said plurality of reference impedance transitions comprises a plate attached to said waveguide.

8. Radar level gauge system according to claim 1, wherein at least one of said plurality of reference impedance transitions comprises two pieces of metal attached to said waveguide, said two pieces having a distance of $\lambda/4$ apart in relation to the frequency range of the transmitted and received electromagnetic signals.

9. Radar level gauge system according to claim 1, wherein at least one of said plurality of reference impedance transitions comprises a stamped plate attached horizontally to said waveguide and shaped to give one resonance frequency above the level of the surface and a lower one below the level of the surface.

10. A method for determining a filling level of a product contained in a container, by means of a radar level gauge system comprising:
a transceiver for generating, transmitting and receiving electromagnetic signals within a frequency range,
a waveguide arranged to extend into said product contained in the container and to guide signals transmitted from said transceiver towards a surface of said product and to guide echo signals resulting from reflections at impedance transitions encountered by the transmitted electromagnetic signals, including surface echo signals resulting from reflection at said surface, back to said transceiver,
processing circuitry connected to the transceiver and arranged to determine the level of the surface based on a relation between the transmitted and received electromagnetic signals,
an interface for providing communication externally of said system and for receiving power to the radar level gauge system, and
a plurality of reference impedance transitions being arranged at known position along the waveguide and being configured to reflect a portion of said transmitted electromagnetic signals back towards said transceiver,
wherein each of said reference impedance transitions has a first reflection coefficient for said electromagnetic signals when the level of the surface is above the reference impedance transition and a second reflection coefficient for said electromagnetic signal when the level of the surface is below the reference impedance transition, said first reflection coefficient being substantially lower than said second reflection coefficient,
said method comprising the steps of:
identifying, based on received electromagnetic signals reflected by said reference impedance transitions, a set of reference impedance transitions located above the level of the surface,
selecting first and second reference impedance transition comprised in said set of reference impedance transitions,
determining a propagation velocity compensation factor based on a known distance between said first and second reference impedance transition and a distance therebetween determined using received electromagnetic signals reflected by said first and second reference impedance transition, respectively, and
determining the level of the surface based on a received electromagnetic signal reflected by the surface of the product, and said propagation velocity compensation factor.

11. Method according to claim 10, wherein the waveguide is a single wire transmission line of Goubau-type.

12. Method according to claim 10, wherein at least one of said plurality of reference impedance transitions comprises a cylinder arranged to essentially enclose a portion of said waveguide.

13. Method according to claim 10, wherein at least one of said plurality of reference impedance transitions comprises a plate attached to said waveguide.

14. Method according to claim 10, wherein at least one of said plurality of reference impedance transitions comprises two pieces of attached to said waveguide, said two pieces having a distance of $\lambda/4$ apart in relation to the frequency range of the transmitted and received electromagnetic signals.

15. Method according to claim 10, wherein at least one of said plurality of reference impedance transitions comprises a stamped plate attached horizontally to said waveguide and shaped to give one resonance frequency above the level of the surface and a lower one below the level of the surface.

* * * * *